United States Patent Office 3,297,751
Patented Jan. 10, 1967

3,297,751
PROCESS FOR THE PRODUCTION OF CYCLIC PHOSPHONITRILES
Kazimiera J. L. Paciorek and Reinhold H. Kratzer, Costa Mesa, Calif., assignors to American Potash & Chemical Corporation, Los Angeles, Calif., a corporation of Delaware
No Drawing. Filed June 4, 1965, Ser. No. 461,516
7 Claims. (Cl. 260—551)

This present invention relates to phosphorus compounds and has particular reference to phosphonitrile compounds.

Prior to this invention considerable difficulty was experienced in producing phosphorus-nitrogen compounds, particularly polymeric phosphonitrile compounds.

According to this invention polymeric phosphonitrile compounds are conveniently produced in high yields by admixing and reacting a halophosphine and silyl azide for a period of time sufficient to produce a polymeric phosphonitrile.

The polymeric phosphonitrile products of this reaction enjoy wide utility. For example, they are particularly useful as thermally stable materials, components of inorganic backbone polymers for high temperature application, thermal and electric insulators to be used at high temperatures and the like.

The silyl azide reactants used in the process of this invention can be prepared by the procedures described by R. West and J. S. Thayer, J. Am. Chem. Soc., 84, 1763 (1962) or W. Sundermeyer, Chem. Ber., 96, 1293 (1963).

The halophosphines employed in the process of this invention may be prepared by a Friedel-Crafts reaction, from trichlorophosphine and benzene, for example.

In general, in accordance with the present invention, phosphonitrile polymers are prepared by admixing and reacting, in a solvent, a disubstituted halophosphine having the formula $R_2PX$ and a trisubstituted silyl azide having the formula $R_3SiN_3$. The reaction is carried out at a temperature between the boiling and the freezing points of the reaction mixture for a period of time sufficient to produce the desired disubstituted phosphonitrile polymer. The disubstituted phosphonitrile polymer comprises recurring units represented by the formula:

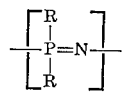

Generally these polymers are cyclic trimers or tetramers.

The R substituents in the formulas given above for the disubstituted halophosphine and trisubstituted silyl azide reactants, and the disubstituted phosphonitrile polymer products comprise hydrocarbon groups selected from the class consisting of lower alkyl groups having from 1 to 5 carbon atoms, and phenyl and lower alkyl substituted phenyl groups having from 7 to 10 carbon atoms. The halogen group in the disubstituted halophosphine reactant may be either chlorine or bromine.

The surprising discovery has been made that the reaction proceeds to completion over a relatively wide range of temperatures. In many cases, for example, the reaction can be carried out at temperatures as low as —15° C. or even lower and at temperatures as high as about 150° C. Preferably, the reaction is carried out at temperatures within the range of from about 20° C. to about 80° C. The reaction may be carried out at pressures either above or below the prevailing atmospheric conditions, as desired.

The reaction is considered complete when substantially all of one or both of the reactants has been consumed substantially completely. This period of time ranges from about 10 seconds or less to about 24 hours or more.

The reaction can be carried out in the presence or absence of a liquid reaction medium, more particularly a solvent. When a liquid reaction medium is used it must be chosen from that class of solvents which do not adversely affect the course of the reaction or the composition of the reaction product.

Suitable liquid reaction media include dialkyl- and cyclic ethers, for example: diethylether and tetrahydrofuran and the like.

When a liquid reaction medium is employed, it is generally employed in any amount ranging from about 0.1 to 100 or more times that of the combined weight of the halophosphine and silyl azide reactants. Preferably, the liquid reaction medium is so chosen that its physical properties facilitate its removal from the reaction product at the completion of the reaction. Such physical properties include volatility, melting point, crystallization characteristics, solubility and the like.

The molar proportions of the reactants may be considerably varied but ordinarily the halophosphine and silyl azide are employed in approximately equal molar proportions. When desired it is possible to carry out the reaction employing either one or the other of these reactants in amounts several hundred times or more in excess of equal molar proportions.

Illustrative examples of the hydrocarbon groups R appearing in the formulas for the halophosphine and silyl azide reactants and the phosphonitrile polymers include for example, methyl, ethyl, propyl, isopropyl, butyl, isobutyl, amyl, isoamyl, neopentyl, phenyl, tolyl, xylyl, ethylpenyl, propylphenyl, isopropylphenyl, butylphenyl and the like.

The phosphonitrile polymers produced by the reaction of this invention can be recovered, for example, as liquids, solids, as solid precipitates, or dissolved in a suitable solvent. The recovered polymer can be isolated by any conventional isolation procedure such as, crystallization, filtration, distillation and the like.

In order that those skilled in the art may better understand how the present invention can be carried into effect, the following specific examples are set forth. The examples are given by way of illustration and not by way of limitation. All parts and percentages are by weight unless otherwise indicated.

*Example 1*

This example is illustrative of the reaction of a halophosphine with a silyl azide in a preferred solvent to produce a phosphonitrile trimer. Diphenylphosphinous chloride $(C_6H_5)_2PCl$ (6.60 g., 0.03 mole) in ether (50 ml.) is added to a reaction flask containing a solution of triphenylsilyl azide $(C_6H_5)_3SiN_3$ (9.04 g., 0.03 mole) in ether (50 ml.). An inert atmosphere is maintained in the flask. The reaction flask, which is equipped with a reflux condenser is then heated in an oil bath to about 50° C. A sudden vigorous boiling, gas evolution, and yellow discoloration is observed in the contents of the flask. The oil bath is removed. The gas evolution continues for about 1 hour without external heating. During this period a yellowish precipitate is deposited. The mixture is subsequently refluxed overnight. The yellow precipitate (4.90 g., 82% yield) which is filtered off, is shown by infrared spectral analysis to consist of impure [(C₆H₅)₂PN]₃. Crystallization from acetonitrile gives pure [(C₆H₅)₂PN]₃, M.P. 226–227, in 68% yield, identified by mixed melting point with an authentic sample and by comparison of the infrared spectra. Removal of ether from the filtrate in vacuo affords triphenylsilyl chloride, identified by melting point (94–96°) and comparison of its infrared spectrum with that of a genuine sample.

*Example II*

This example is illustrative of the preparation of a phosphonitrile trimer using trimethylsilyl azide and diphenylchlorophosphine. Trimethylsilyl azide $(CH_3)_3SiN_3$ (3.46 g., 0.03 mole) in ether (25 ml.) is added to a reaction flask containing a solution of diphenylphosphinous chloride $(C_6H_5)_2PCl$ (6.60 g., 0.03 mole) in ether (75 ml.). An inert atmosphre is maintained in the flask. The reaction flask, which is equipped with a reflux condenser, is allowed to stand without external heating for 3 hours. Slight refluxing accompanied by yellow discoloration and precipitation is observed during this period. Subsequently the reaction mixture is refluxed overnight. After cooling, the solid is filtered off (5.43 g., 91% yield) its infrared spectrum indicates pure $[(C_6H_5)_2PN]_3$; however, the melting point (208–220° C.) is depressed. Crystallization from acetonitrile affords pure $[(C_6H_5)_2PN]_3$ M.P. 226–227 in an overall 61% yield. It is identified by mixed melting point with an authentic sample and by the comparison of the infrared spectra.

*Example III*

This example is illustrative of carrying out the process of this invention at very low temperatures. On a high vacuum line ether (14.332 mmoles) is condensed onto $(C_6H_5)_2PCl$ (740.6 mg., 3.3565 mmoles) at −196° C. The mixture is warmed to 0° C. to effect solution, then trimethylsilyl azide (3.2906 mmoles) is distilled onto the solution at −78° C. The reaction mixture is warmed to −24° C. and maintained at this temperature for 4 hours. The volatiles are removed at −24° C. and fractionated through four traps kept at −47°, −63°, −78° and −196° C., respectively. No noncondensable gas had been formed. In the −47° and −63° C., traps

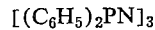

is collected (vapor pressure at 0° C., 16.5 mm.) while the −196° C. trap contains only ether (vapor pressure at 0° C., 189 mm.). The volatiles are distilled back onto the $(C_6H_5)_2PCl$ (at −78° C.). The ether is distilled back first followed by $(CH_3)_3SiN_3$. The reaction ampoule is warmed to −13° C. and allowed to stand at this temperature for 70 min. Yellow discoloration is observed and some nitrogen (36%, based on $(CH_3)_3SiN_3$ used) is evolved. The ampoule is cooled to −24° C. and the volatiles are distilled off again. These volatiles are fractionated through a Dry-Ice cooled column followed by fractionation of the less volatile materials through five traps maintained at −24°, −47°, −63°, −78°, and −196° C., respectively. By this procedure 13.387 mmoles of pure ether and 1.9853 mmoles of pure

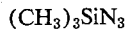

are separated together with a 2.0968 mmole fraction which contains only ether and $(CH_3)_3SiCl$ as determined by infrared spectral analysis. In addition 0.0849 mmole of $(CH_3)_3SiN_3$ is recovered. Ether is returned to the ampoule which is sealed and heated at 100° C. for 3 hours. On opening of the ampoule, 1.8337 mmoles of nitrogen is obtained. The ratio of $(CH_3)_3SiN_3$ consumed to $(CH_3)_3SiCl$ produced to total nitrogen evolved is 1.02:1.03:1.

The solid residue left in the ampoule is crystallized from acetonitrile (acetonitrile insoluble material is discarded), followed by boiling with benzene. The benzene soluble fraction consists of pure $[(C_6H_5)_2PN]_3$, obtained in a 29% yield.

A parallel reaction to the one described but conducted at 0° C. for 30 min. instead of −24° C. for 4 hours affords 35% of nitrogen and 99% of $(CH_3)_3SiCl$. The nonvolatile residue obtained upon warming the reaction products to room temperature followed by heating at 150° C. gives an additional 63% of nitrogen. From the residue on purification a 39% yield of $$[(C_6H_5)_2PN]_3$$

is obtained. The overall ratios were: $(C_6H_5)_2PCl$: $(CH_3)_3SiN_3$:$(CH_3)_3SiCl$: $N_2$=1.02:1.04:1.02:1.

*Example IV*

This example is illustrative of carrying out this process in a non-preferred solvent. On a high vacuum line, acetonitrile (7.8422 g.) is condensed onto $(C_6H_5)_2PCl$ (877.0 mg., 3.9747 mmoles) at −78° C. The mixture is warmed to 0° C. to effect solution, then 4.0294 mmoles of $(CH_3)_3SiN_3$ is distilled onto the solution at −78° C. After sealing, the ampoule is allowed to stand at room temperature for 3 hours; during this period the solution developed a discolored yellow color and precipitation is observed. Subsequently, the mixture is heated in an oil bath at 50–55° C. for 12 hours. A considerable quantity of yellow material is formed. Opening to the vacuum system gives 3.7753 mmoles (95%) of nitrogen. The volatiles are removed initially at room temperature; then at 50° C. Total amount of volatiles obtained is 8.2239 g.; the calculated amount is 8.2793 g. (based on $CH_3CN$ employed, $(CH_3)_3SiCl$ produced and $(CH_3)_3SiN_3$ recovered, assuming that no silicon moiety is incorporated in the residue). The residue does not contain any cyclic trimer. The bulk of the product is soluble in boiling benzene, and on cooling an amorphous precipitate is formed which fails to melt up to 480° C., although some darkening is evident at this temperature.

*Analysis.*—Calcd. for $(C_6H_5)_2PN$: C, 72.36; H, 5.06; P, 15.55; N, 7.03. Found: C, 71.87; H, 5.15; P, 14.85; N, 7.40.

Repetition of Example I using diphenylbromophosphine in place of the diphenylchlorophosphine used in that example results in a high yield of trimeric phosphonitrile.

Example II is repeated using triisobutylsilyl azide in place of the trimethylsilyl azide used in that example. A very high yield of trimeric phosphonitrile is produced by this reaction. Repetition of Example II replacing the diphenylchlorophosphine with dimethylchlorophosphine produces a high yield of trimeric dimethylphosphonitrile.

As will be understood by those skilled in the art what has been described are the preferred embodiments of the invention. However, many modifications, changes and substitutions can be made therein without departing from the scope and spirit of the invention as defined in the following claims.

What is claimed is:

1. The process for preparing cyclic polymeric phosphonitriles which comprises: admixing and reacting in a solvent at a temperature of from about −15° C. to 150° C., a halophosphine having the formula $R_2PX$, and a silyl azide having the formula $R_3SiN_3$, for a period of time sufficient to produce a cyclic phosphonitrile polymer having the formula:

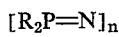

wherein each R is a hydrocarbon group selected from the class consisting of lower alkyl groups containing from 1 to 5 carbon atoms, phenyl, and lower alkyl substituted phenyl groups containing from 7 to 10 carbon atoms, and X is a halogen selected from the group consisting of chlorine and bromine $n$ is an integer selected from the group consisting of 3 and 4, and recovering said phosphonitrile polymer.

2. The process of claim 1 wherein said solvent is selected from the group consisting of lower alkyl ethers.

3. The process of claim 1 wherein said R is phenyl.

4. The process of claim 1 wherein said azide is present in greater than equal molar amounts.

5. The process of claim 1 wherein said silyl azide is triphenylsilyl azide.

6. The process of claim 1 wherein said silyl azide is trimethylsilyl azide.

7. The process of claim 1 wherein said disubstituted halophosphine is diphenylchlorophosphine.

No references cited.

WALTER A. MODANCE, *Primary Examiner.*

HARRY I. MOATZ, *Assistant Examiner.*